C. D. MOSHER.
DUPLEX OIL STRAINER AND FILTER.
APPLICATION FILED OCT. 3, 1919.

1,408,822.

Patented Mar. 7, 1922.
4 SHEETS—SHEET 1.

INVENTOR
Charles D. Mosher.
BY
Thomas D. Hill
ATTORNEY

C. D. MOSHER.
DUPLEX OIL STRAINER AND FILTER.
APPLICATION FILED OCT. 3, 1919.

1,408,822.

Patented Mar. 7, 1922.
4 SHEETS—SHEET 3.

INVENTOR
Charles D. Mosher.
BY
ATTORNEY

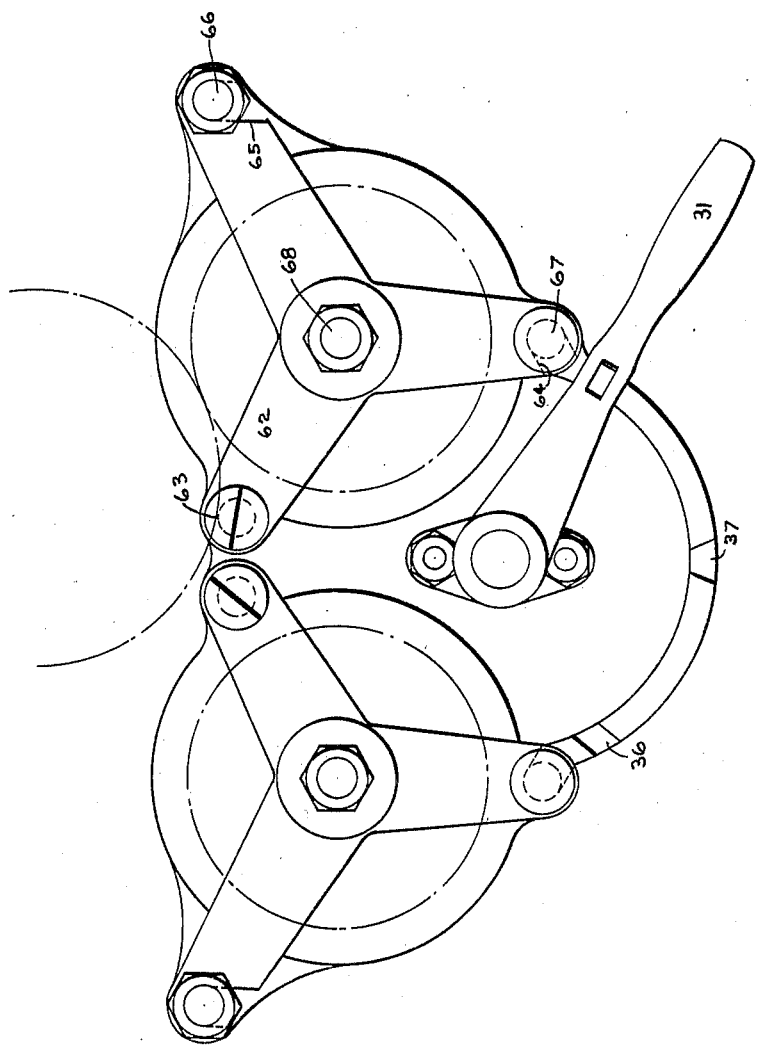

UNITED STATES PATENT OFFICE.

CHARLES D. MOSHER, OF NEW YORK, N. Y.

DUPLEX OIL STRAINER AND FILTER.

1,408,822. Specification of Letters Patent. Patented Mar. 7, 1922.

Application filed October 3, 1919. Serial No. 328,219.

*To all whom it may concern:*

Be it known that I, CHARLES D. MOSHER, a citizen of the United States, residing at New York city, in the county of New York and State of New York, have invented certain new and useful Improvements in Duplex Oil Strainers and Filters, of which the following is a specification, reference being had therein to the accompanying drawing.

My invention relates to improvements in strainers and filters and is illustrated and described herein as a duplex strainer adapted more particularly for straining fuel and lubricating oil, although of course it will be readily understood that the strainer may be used for many other purposes and with many modifications.

One of the principal objects of the invention is to produce a simple, compact and strong form of duplex strainer which will allow for the straining of oil through one strainer, which when it becomes clogged may be discontinued and the other strainer introduced by the simple operation of a valve, while the first strainer is being cleaned, or so that both strainers can be used until such time as either or both of the strainers can be removed and cleaned, and the particular preferred form of the strainer which I have illustrated and described hereinafter is such as to permit of use with high pressures while at the same time the valve operation can be controlled by hand with comparatively little effort.

Figure 1:
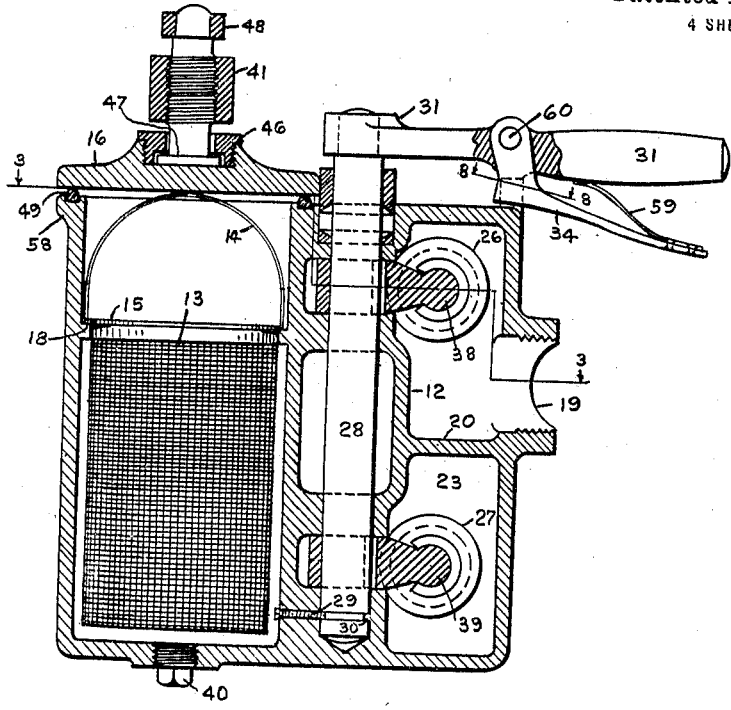
Figure 2:
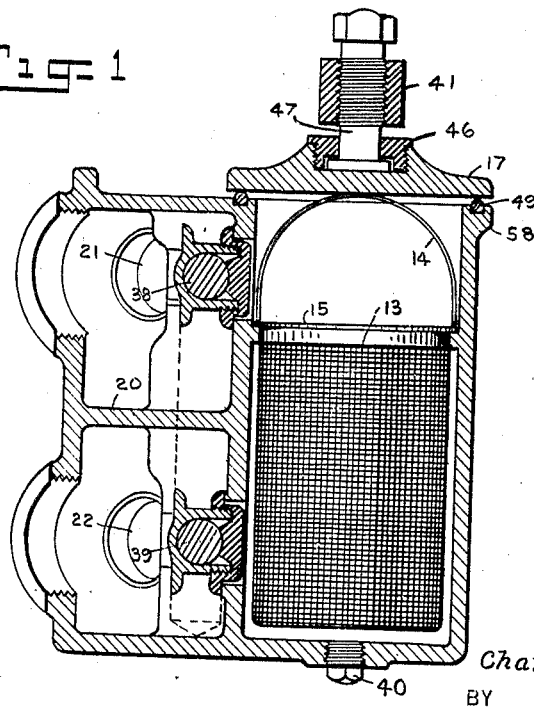
Figure 3:
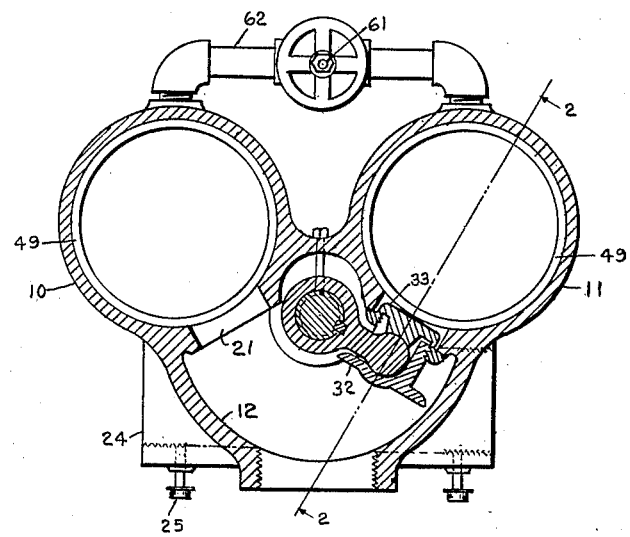
Figure 4:
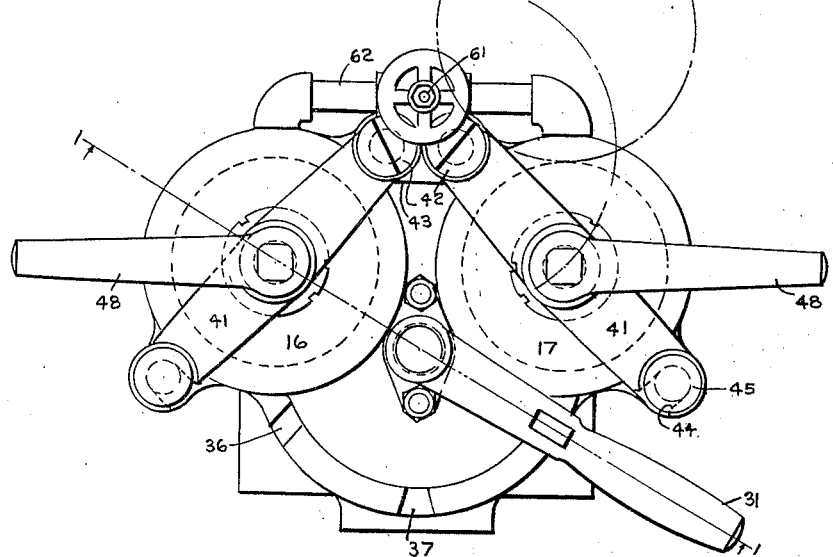
Figure 5:
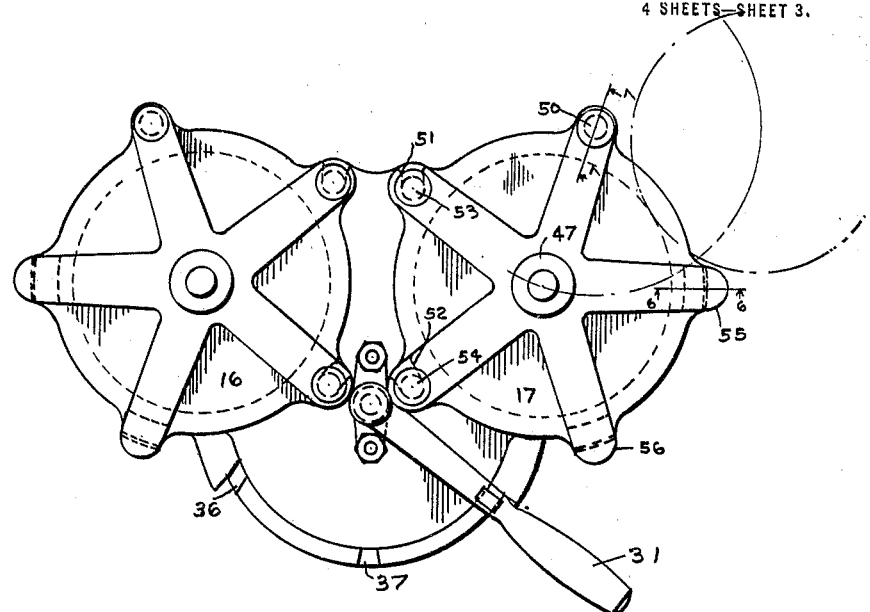
Figure 6:
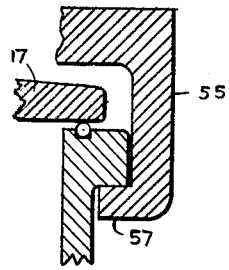
Figure 7:
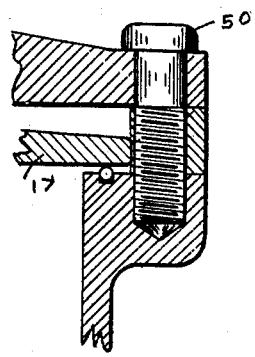
Figure 8:
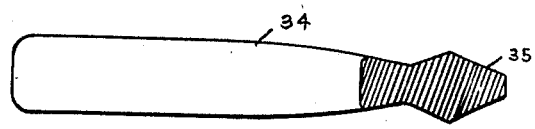

Referring to the accompanying drawings, I have illustrated in Fig. 1 in vertical cross-section, part being broken away, a duplex form of strainer embodying an application of my invention, the same being on the line 1—1 of Fig. 4. Fig. 2 is a vertical cross-section on the line 2—2 of Fig. 3. Fig. 3 is a cross-section on the line 3—3 of Fig. 1. Fig. 4 is a plan view looking down upon the duplex strainer. Fig. 5 is a modification showing spiders of five legs for holding the covers instead of cross bars as shown in Fig. 4, Fig. 5 being also a plan view looking down upon the top of the strainer. Fig. 6 is an enlarged cross-sectional detail on the line 6—6 of Fig. 5, and Fig. 7 is an enlarged cross-sectional detail on the line 7—7 of Fig. 5. Fig. 8 is an enlarged detail on the line 8—8 of Fig. 1 showing the inner end of the engaging means combined with the handle for operating the valves. Fig. 9 is another modification looking down upon the top of the strainer.

The strainer comprises substantially four chambers preferably cast in the single outer casing represented by the cylinders 10—11 and the valve intercommunicating chambers 12—23. These cylinders are adapted to receive the strainers such as 13 which may be provided with the bail or handle such as 14 adapted to project upwardly beneath the covers such as 16—17 for retaining the strainer in position. The strainer may be made in the form of a perforated cylinder with a perforated bottom having a flanged top 15 for engaging the ledge 18 upon the inside of the cylinder of the casing as shown in Fig. 1. The particular construction of these inner strainers, or sieves, in their preferred form are the subject of other patent applications.

Referring now more particularly to Figs. 1 and 3, it will be observed that oil or other liquid to be strained may enter by the inlet 19 passing into the valve chamber 12 above the web or partition 20 and passes through the port 21 above the top of the strainer 13 passing down through said strainer to the port 22 back into the lower valve chamber 23 below the web or partition 20 where it escapes through the outlet 24 having been strained as shown.

After the strainer has been operating for a considerable time the strainer basket or cylinder 13 may become partially clogged or filled with dirt, grit or other foreign matter in which case the pressure gauges 25 will indicate a material difference in pressure. This increase in the pressure of the oil within the inlet chamber 12 over the outlet chamber 23 shows that it is time to throw the valves so as to have the oil feed through the other strainer in order that the clogged strainer may be removed and cleaned. For this purpose suitable valves 26—27 are mounted upon the spindle 28 vertically mounted to rotate within the casing as shown and provided with a locking screw 29 which engages a recess 30 in said valve stem and provided at the top with a handle 31 for rotating said valve stem and its valves. These valves are provided with seatings on both sides as indicated by the reference characters 32—33 in Fig. 3 so that as they are swung completely to one side or the other they close and open the ports of the cylinders at opposite sides of the strainer as shown. In order to bring the other strainer into operation it is therefore necessary to swing the valve lever 31, looking at Fig. 4, leftwardly until the inner end 35 of the engaging member 34 engages the groove 36. This now opens the ports communicating between the valve chamber 12 and the cylinder 11 and closes the ports communicating between the valve chamber and cylinder 10 with the result that the oil entering through the inlet 19 now passes into the upper port of the cylinder 11 passing downwardly through its strainer basket which is below the web 20 and into the lower valve chamber 23 escaping through the outlet 24, and should the pressure be increased by sediment or other foreign matter clogging the strainer, the pressure indicator will again show this increased pressure, above that shown in the pressure gauge 25, and if the first strainer has been removed and cleaned so that the valves can be thrown back to the original position to allow the oil to pass through the clean strainer, the valve handle 31 may be dis-engaged by raising the lever 34 by grip of the hand, and the engaging member 34—35 may be brought to the intermediate notch 37, which leaves the valves substantially centrally hinged within the valve chambers 12 and 23, thus allowing the oil entering by the inlet 19 to pass through both ports communicating with both strainer cylinders in the upper valve chamber above the partition or web 20 and allowing the oil to be strained and fed back from both strainers to the lower valve chamber 23, below the web 20 where it escapes by the outlet 24.

The valves 26—27 are of course preferably mounted upon ball joints such as 38—39 as shown so as to allow the same to automatically adjust themselves to their own seatings and the bottoms of the cylinders 10—11 are preferably bored and adapted to receive plugs such as 40 for draining and cleaning the same.

The covers such as 16 and 17 of the cylinders are preferably secured in a cross piece or yoke such as 41 shown in Fig. 4 a cross-section of the same being indicated to advantage in Fig. 2. One end of this yoke is bored to receive a screw or bolt such as 42 which passes through the same and anchors into the casting between the cylinders substantially as shown, leaving the yoke free to swing upon the bolt or screw 42 as a pivot, and suitable raised pieces such as 43 being provided to compensate for the thickness of the cover such as 16. The outer end of the yoke is preferably cut away as indicated at 44 to clear the shank of the screw or bolt 45 also secured to the casting of the cylinder with a base shoulder sufficiently high to compensate for the thickness of the cover such as 16 so that the yoke is free to swing upon the bolt 42 and is cut away at its outer end to slide beneath the head of the bolt 45.

The top of the cover as shown in Figs. 1 and 2 may be cut away to receive the threaded member such as 46 which is internally recessed to receive the flanged bolt 47 the stem of which is threaded to engage the yoke 41 as shown. The top of the stem may also be engaged by the suitable wrench or lever such as 48 so that upon turning the member 47 it forces the cover 16 iownwardly upon the sealing rings 49 of copper or other suitable material, in the tops of the cylinders. To remove the strainers for cleaning, a slight turn of the lever or wrench 48 is sufficient to release the pressure upon the cover such as 16, when they may be conveniently swung clear disengaging the yokes such as 41 from the bolts 45 leaving sufficient clearance to withdraw the strainer baskets such as 13 by their bails 14. The heads of the bolts such as 45 may be rectangular, hexagonal or otherwise, so as to be operative with the same wrench as 48.

In the modification shown in Fig. 5 I have shown a yoke with five legs or spokes in place of the yokes 41 for retaining the covers in position. In that case the cover such as 17 may be pivotally secured at 50 and the outer ends of two of the legs of the spider or star may be cut away as indicated at 51—52 so as to facilitate their engagement with the bolts 53—54 as shown. The outer ends of the other two legs 55—56 may be turned under as indicated in Fig. 6 at 57, thus engaging the periphery rim or flange 58 of the cylinder as shown in Fig. 1. With the ends of the yoke or spider engaged beneath the flange 58 and bolts 53—54 as aforesaid, the threaded spindle 47 may now be turned down by the wrench such as 48 until the necessary pressure has been applied to the cover such as 17, and if it is desired to further increase the pressure upon the cover 17 the wrench can be removed from the threaded spindle 47 and applied to the bolts 53—54 where further pressure at greater leverage can be still applied, thus hermetically locking the cover against considerable pressure within the cylinders.

Referring now more particularly to Fig. 9, it will be observed that a three-legged yoke or star may also be used to advantage in which case one leg such as 62 of the yoke may be pivotally secured as at 63. The other legs may be cut away as indicated at 64—65 to receive the bolts 66—67, the bolt 66 being preferably threaded so that after the cover has been driven down with a suitable wrench operating upon the central bolt 68, it can be transferred to the bolt 66, and additional pressure at greater leverage can be applied.

Referring now more particularly to the grooves such as 36—37 it will be observed that while the slot 37 is in radial alignment for engaging the tapered inner end 35 of the engaging member 34, the other groove such as 36 for engagement by said member when the valves are not in neutral position are not radial to the spindle 28 of the lever, but are somewhat tangential thereto so that when the valve has been brought to its seat by swinging the handle 31 in its desired direction the tapered end 35 of the engaging member 34 has just entered the tangential slot such as 36 and under pressure of the spring such as 59 is forced home until the outer end of the engaging member 34 is depressed in its extreme downward position thus securely seating the valve with considerable pressure. From the foregoing it will be seen that with a spring such as 59 of sufficient tension to be conveniently manipulated by the grip of the hand a very considerable pressure can be applied automatically upon the seating of the valves, first because of the leverage measured approximately by the length of the engaging member 34 which again is duplicated substantially between the pivotal mounting 60 of the engaging member 34 upon the lever 31 and the pivotal axis of said lever, namely, the spindle 28, from which it will be seen that several hundreds of pounds can conveniently and automatically be applied to the final seating of the valves after they have been actually swung into closed position against their seats by the operation of the hand lever 31, thus providing a simple and efficient method of dealing with considerable pressures without undue exertion in the manipulation of the valves and providing a convenient and quickly operative arrangement for shifting the same.

Referring now more particularly to Figs. 3 and 4, it will be observed that a suitable by-pass valve 61 may be provided upon the pipe 62 connecting the cylinders 10—11 as shown so that should the pressure in one cylinder become sufficiently excessive to render difficult the operation of lifting the valves off from their seats, by opening the by-pass valve 61 the pressure of the operating cylinder can then be communicated to the other cylinder, thereby equalizing the pressure in both cylinders and making it easy to operate the valves.

Of course, it will be understood that various modifications may be made in the construction and arrangement of parts without departing from the spirit of the invention as claimed.

I claim:

1. In a multi-unit strainer, a valve chamber and a double sided valve therein, and means in combination therewith for shifting said valve so as to feed through either of said strainers, and in combination therewith, means for causing said valve to automatically seat itself under pressure after the same has been brought to its seating, said last stated means comprising a spring retained member adapted to be released and to force said valves on to their seats after the valve shifting device has been operated.

2. In an apparatus of the class described, valve chambers and double seated valves therein, means in combination therewith for shifting said valves so as to feed through either or all of said strainers, and in combination therewith means for causing said valves to simultaneously and automatically seat themselves under pressure, said means comprising a forwardly and rearwardly tapering member engaging an angular slot, the movement of said tapering member in said slot forcing the valves tightly against their seats when entering, said movement being controlled automatically by the tension of a spring connected to an extension of said tapering member, the movement of said tapering member in said slot being communicated simultaneously to the valves by means of an attached valve shifting lever secured to the valve shaft.

3. In an apparatus of the class described, valve chambers and double seated valves therein, means in combination therewith for lifting said valves simultaneously off their seats when under pressure, said means comprising a forwardly and rearwardly tapering member engaging an angular slot, the movement of said tapering member in the slot being controlled by an arm extended from said tapering member, the movement being communicated to the valves by a valve shifting lever secured to the valve shaft.

In testimony whereof I hereunto affix my signature in the presence of two witnesses.

CHARLES D. MOSHER.

Witnesses:
DAVID H. DOUGLASS,
MADELINE C. FOERST.